(12) United States Patent
Tsuzaki

(10) Patent No.: US 7,598,719 B2
(45) Date of Patent: Oct. 6, 2009

(54) SWITCHING REGULATOR WITH IMPROVED POWER SUPPLY VOLTAGE VARIATION RESPONSE

(75) Inventor: Toshiyuki Tsuzaki, Chiba (JP)

(73) Assignee: Seiko Instruments Inc., Chiba (JP)

( * ) Notice: Subject to any disclaimer, the term of this patent is extended or adjusted under 35 U.S.C. 154(b) by 232 days.

(21) Appl. No.: 11/633,296

(22) Filed: Dec. 4, 2006

(65) Prior Publication Data
US 2007/0132439 A1  Jun. 14, 2007

(30) Foreign Application Priority Data
Dec. 8, 2005 (JP) ............................. 2005-354635

(51) Int. Cl.
*G05F 1/575* (2006.01)
(52) U.S. Cl. .................... 323/299; 323/282; 330/254
(58) Field of Classification Search ........... 323/299, 323/282, 280, 283–286; 330/254
See application file for complete search history.

(56) References Cited

U.S. PATENT DOCUMENTS

| | | | |
|---|---|---|---|
| 6,424,132 B1 * | 7/2002 | Wrathall | 323/282 |
| 6,583,609 B1 * | 6/2003 | Pardoen | 323/283 |
| 7,218,082 B2 * | 5/2007 | Walter et al. | 323/273 |
| 2005/0088159 A1 * | 4/2005 | Itohara | 323/284 |

OTHER PUBLICATIONS

"SII CMOS IC Data Book 2004, Power Supply IC•MOS FET Part", Fig. 12, p. 4-314, 2004.

* cited by examiner

*Primary Examiner*—Adolf Berhane
*Assistant Examiner*—Harry Behm
(74) *Attorney, Agent, or Firm*—Brinks Hofer Gilson & Lione

(57) ABSTRACT

Provided is a switching regulator having an improved power supply voltage variation response characteristic while maintaining the stability of an output voltage to oscillation. An output resistance of an error amplifier is adjusted by a power supply voltage variation response improving circuit to allow a gain of the error amplifier to change.

12 Claims, 2 Drawing Sheets

US 7,598,719 B2

SWITCHING REGULATOR WITH IMPROVED POWER SUPPLY VOLTAGE VARIATION RESPONSE

This application claims priority under 35 U.S.C. § 119 to Japanese Patent Application No. JP2005-354635 filed Dec. 8, 2005, the entire content of which is hereby incorporated by reference.

BACKGROUND OF THE INVENTION

1. Field of the Invention

The present invention relates to a switching regulator, and more particularly, to an improvement of a power supply voltage variation response characteristic of a switching regulator.

2. Description of the Related Art

A conventional switching regulator includes a transconductance amplifier error amplifier. The transconductance amplifier error amplifier compares a voltage generated by dividing a voltage at an output voltage terminal by dividing resistors with a reference voltage produced from a reference voltage circuit and amplifies a potential difference therebetween. A gain of the transconductance amplifier error amplifier is determined based on an output current and a transconductance amplifier error amplifier output resistance. The switching regulator includes an LC filter which is composed of a coil and an output capacitor, so a significant phase delay occurs near a cutoff frequency of the LC filter. When the gain is equal to or larger than 0 dB in a frequency region in which the phase is delayed by 180 degrees or more, abnormal oscillation occurs. Therefore, it is necessary to reduce the gain in a high-frequency region near the cutoff frequency of the LC filter (see "SII CMOS IC DATA BOOK 2004, Power Supply IC•MOS FET Part", pp. 4-314, FIG. 12).

FIG. 3 is a block diagram showing a switching regulator. The switching regulator includes a switching regulator control IC 34, a power supply 29, an output driver transistor 30, a diode 31, a coil 32, and an output capacitor 33.

The switching regulator control IC 34 has the following structure and operates as follows. A voltage at an output voltage terminal 35 is divided by a dividing resistor 37 to sense an output voltage. The output voltage generated by the voltage division using the dividing resistor 37 is compared with a reference voltage 39 by a transconductance amplifier error amplifier 38 and a result obtained by the comparison is amplified by the transconductance amplifier error amplifier 38. An output terminal of the transconductance amplifier error amplifier 38 is connected with a transconductance amplifier output resistor portion 40. A voltage outputted from the transconductance amplifier error amplifier 38 is compared with a voltage outputted from a triangular wave generating circuit 42 by a PWM comparator 41 to generate a PWM waveform corresponding to the voltage outputted from the transconductance amplifier error amplifier 38. The PWM waveform outputted from the PWM comparator 41 passes through a buffer 43 and then is inputted to a gate of the output driver transistor 30. A gain of the transconductance amplifier error amplifier 38 is determined by "(output current from transconductance amplifier error amplifier 38)×(resistance of transconductance amplifier output resistor portion 40)".

FIG. 4 is a circuit diagram showing an example of the transconductance amplifier output resistor portion 40 of the conventional switching regulator. Resistors 3 and 4 are connected in parallel. One end of each of the resistors 3 and 4 is connected with an output-resistance input terminal 1. The other end of the resistor 3 is grounded and the other end of the resistor 4 is grounded through a capacitor 5. The output-resistance input terminal 1 is connected with the output terminal of the transconductance amplifier error amplifier 38. An output resistance in a low-frequency region corresponds to a resistance of the resistor 3. On the other hand, the output resistance in a high-frequency region in which the capacitor 5 appears to be a short-circuit is a parallel resistance of the resistors 3 and 4, thereby determining the gain. That is, (resistance of resistor 3)>(parallel resistance of resistors 3 and 4) is satisfied, so (gain in low-frequency region)>(gain in high-frequency region) is satisfied.

In the switching regulator as describe above, in order to maintain the stability of the output voltage to the oscillation, the resistance of the transconductance amplifier output resistor portion is reduced in the high-frequency region near the cutoff frequency of the LC filter, thereby reducing the gain.

However, the conventional switching regulator has the following problem. In order to prevent the abnormal oscillation, the gain of the transconductance amplifier error amplifier is reduced in the high-frequency region near the cutoff frequency of the LC filter. Then, even when a variation in output voltage occurs in the high-frequency region, a response of the transconductance amplifier error amplifier is slow, so a power supply voltage variation response characteristic is low.

SUMMARY OF THE INVENTION

The present invention has been made to solve the above-mentioned problem. An object of the present invention is to provide a switching regulator having an improved power supply voltage variation response characteristic while maintaining the stability of an output voltage to oscillation.

In the switching regulator according to the present invention, a power supply voltage variation response improving circuit is added into a switching regulator control IC to temporarily change an output resistance of an error amplifier. Therefore, the above-mentioned problem is solved, so the power supply voltage variation response characteristic is improved.

According to the switching regulator control IC in the present invention, it is possible to provide the switching regulator having the improved power supply voltage variation response characteristic while maintaining the stability of the output voltage to oscillation.

DETAILED DESCRIPTION OF THE PREFERRED EMBODIMENT

Figure 1:
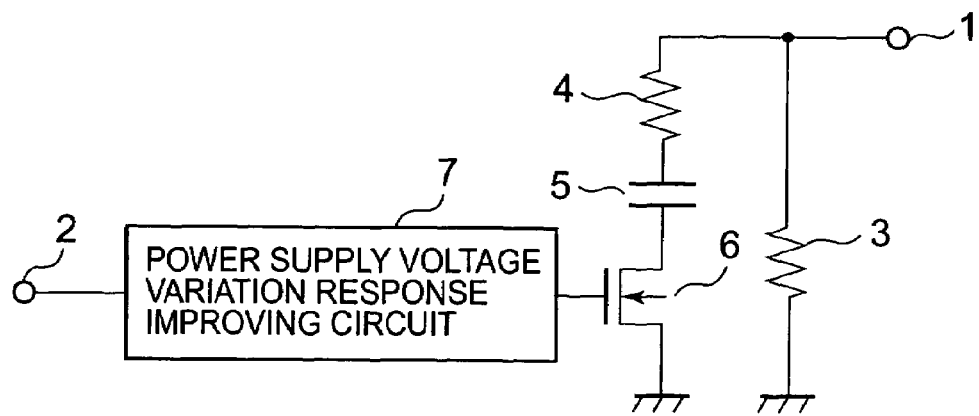
FIG. 1 is a circuit diagram showing a transconductance amplifier output resistor portion of a switching regulator according to the present invention.
Figure 3:
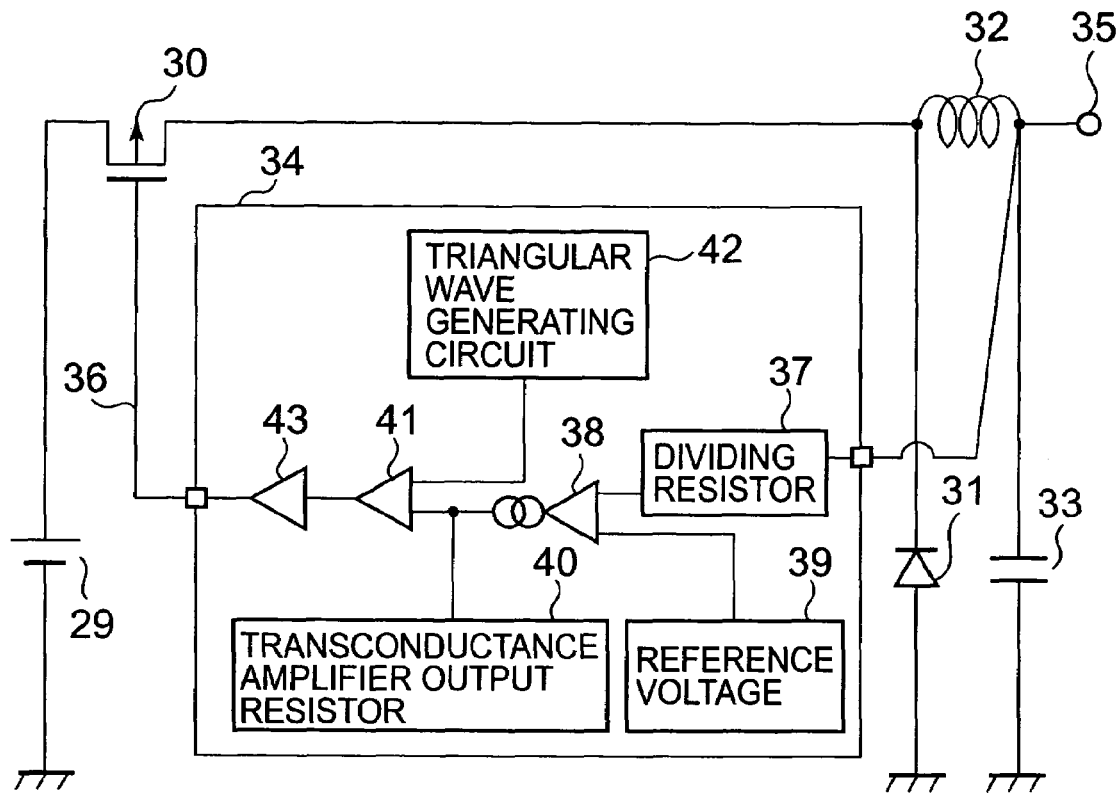
FIG. 3 is a block diagram showing a conventional switching regulator.
Figure 4:
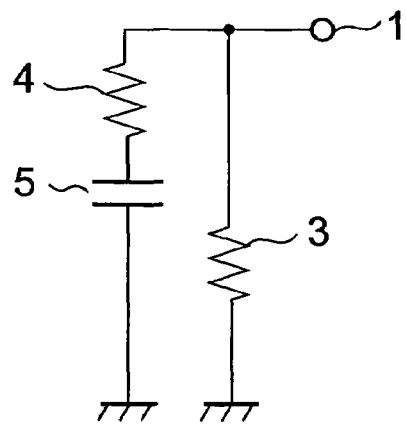
FIG. 4 is a circuit diagram showing a transconductance amplifier output resistor portion of the conventional switching regulator.

FIG. 1 is a circuit diagram showing a transconductance amplifier output resistor portion of a switching regulator according to the present invention. In the transconductance amplifier output resistor portion, a resistor 4 and a capacitor 5 which are connected in series are connected in parallel with a resistor 3. One end of the resistor 4 is connected with an output-resistance input terminal 1. One end of the capacitor 5 is grounded through an N-type MOS transistor 6. A gate of the N-type MOS transistor 6 is connected with an output terminal of a power supply voltage variation response improving circuit 7. An input terminal 2 of the power supply voltage variation response improving circuit 7 is connected with the power supply 29 shown in FIG. 3. The output-resistance input terminal 1 is connected with the output terminal of the transconductance amplifier error amplifier 38 of the switching regulator control IC shown in FIG. 3.

It is assumed that a normal operation state is a state in which a voltage of the power supply 29 does not vary, and that a power supply voltage variation state is a state in which the voltage of the power supply 29 varies. When a voltage at the input terminal 2 does not vary, the power supply voltage variation response improving circuit 7 generates a High-level. When the voltage at the input terminal 2 varies, the power supply voltage variation response improving circuit 7 generates a Low-level for a predetermined period.

That is, the transconductance amplifier output resistor portion in the present invention operates based on the voltage of the power supply 29 as follows. In the normal operation state, the voltage at the input terminal 2 does not vary, so the power supply voltage variation response improving circuit 7 generates the High-level. Then, the N-type MOS transistor 6 is turned on. Therefore, an output resistance value in a low-frequency region is a resistance of the resistor 3. An output resistance value in a high-frequency region is a parallel resistance of the resistors 3 and 4. On the other hand, in the power supply voltage variation state, the voltage at the input terminal 2 varies, so the power supply voltage variation response improving circuit 7 generates the Low-level for the predetermined period. Then, the N-type MOS transistor 6 is off for the predetermined period. Therefore, even in the high-frequency region, the output resistance value is the resistance of the resistor 3, so the gain does not reduce. After the lapse of the predetermined period, the output voltage of the power supply voltage variation response improving circuit 7 becomes the High-level. Then, the N-type MOS transistor 6 is turned on, so the output resistance value becomes equal to that in the normal operation state.

Figure 2:
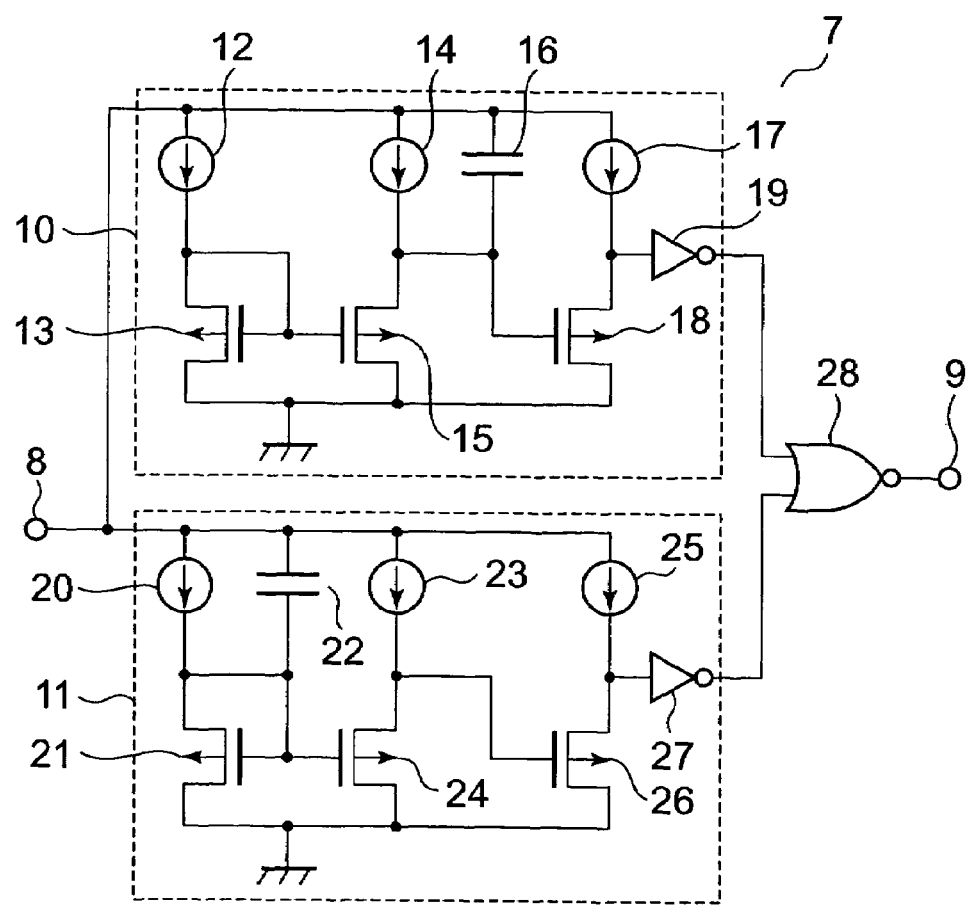
FIG. 2 is a circuit diagram showing a power supply voltage variation response improving circuit of the switching regulator according to the present invention.

FIG. 2 is a circuit diagram showing a power supply voltage variation response improving circuit 7 of the switching regulator according to the present invention. The power supply voltage variation response improving circuit 7 includes a circuit 10 (for case of increase in power supply voltage) which operates in the case where a power supply voltage increases and a circuit 11 (for case of decrease in power supply voltage) which operates in the case where the power supply voltage decreases. Output signals of the circuits 10 and 11 are inputted to a NOR circuit 28. An output of the NOR circuit 28 is outputted to an output terminal 9.

First, an operation of the circuit 10 (for case of increase in power supply voltage) will be described. A current value of a constant current source 12 is equal to that of a constant current source 14. A threshold voltage of an N-type MOS transistor 13 is equal to that of an N-type MOS transistor 15. An N-type MOS transistor 18 is a transistor having a threshold voltage higher than that of the N-type MOS transistor 15. In the normal operation state, a drain voltage of the N-type MOS transistor 15 is lower than the threshold voltage of the N-type MOS transistor 18, so the N-type MOS transistor 18 is off. Therefore, a drain voltage of the N-type MOS transistor 18 becomes a High-level, with the result that an output of an inverter 19 becomes a Low-level.

In a power supply voltage variation state in which the power supply voltage increases, the drain voltage of the N-type MOS transistor 15 is increased by a capacitor 16 for a predetermined time, so the N-type MOS transistor 18 is turned on. Therefore, the drain voltage of the N-type MOS transistor 18 becomes the Low-level, with the result that the output of the inverter 19 becomes the High-level. The time for which the N-type MOS transistor 18 is on is substantially determined by "(current value of constant current source 14)× (variation value of power supply voltage)/(capacitance value of capacitor 16)". In a power supply voltage variation state in which the power supply voltage decreases, the drain voltage of the N-type MOS transistor 15 decreases. However, the N-type MOS transistor 18 is off, so the output of the inverter 19 becomes the Low-level as in the normal operation state.

Next, an operation of the circuit 11 (for case of decrease in power supply voltage) will be described. A current value of a constant current source 20 is equal to that of a constant current source 23. A threshold voltage of an N-type MOS transistor 21 is equal to that of an N-type MOS transistor 24. An N-type MOS transistor 26 is a transistor having a threshold voltage higher than that of the N-type MOS transistor 24. In the normal operation state, a drain voltage of the N-type MOS transistor 24 is lower than the threshold voltage of the N-type MOS transistor 26, so the N-type MOS transistor 26 is off. Therefore, a drain voltage of the N-type MOS transistor 26 becomes a High-level, with the result that an output of an inverter 27 becomes a Low-level.

In a power supply voltage variation state in which the power supply voltage decreases, a gate voltage of the N-type MOS transistor 24 is decreased by a capacitor 22 for a predetermined time and the drain voltage of the N-type MOS transistor 24 increases, so the N-type MOS transistor 26 is turned on. Therefore, the drain voltage of the N-type MOS transistor 26 becomes the Low-level, with the result that the output of the inverter 27 becomes the High-level. The time for which the N-type MOS transistor 26 is on is substantially determined by "(current value of constant current source 22)× (variation value of power supply voltage)/(capacitance value of capacitor 23)". In a power supply voltage variation state in which the power supply voltage increases, the gate voltage of the N-type MOS transistor 24 increases and the drain voltage of the N-type MOS transistor 24 decreases. However, the N-type MOS transistor 26 is off, so the output of the inverter 27 becomes the Low-level as in the normal operation state.

Thus, in the normal operation state, each of the output voltage of the circuit 10 (for case of increase in power supply voltage) and the output voltage of the circuit 11 (for case of decrease in power supply voltage) is a Low-level, so the output of the NOR circuit 28 becomes a High-level. In the power supply voltage variation state in which the power supply voltage increases, the output of the circuit 10 (for case of increase in power supply voltage) is the High-level and the output of the circuit 11 (for case of decrease in power supply voltage) is the Low-level, with the result that the output of the NOR circuit 28 becomes a Low-level. In the power supply voltage variation state in which the power supply voltage decreases, the output of the circuit 10 (for case of increase in power supply voltage) is the Low-level and the output of the circuit 11 (for case of decrease in power supply voltage) is the high-level, with the result that the output of the NOR circuit 28 becomes the Low-level.

According to the above-mentioned structure, when the power supply voltage varies, the output resistance of the transconductance amplifier error amplifier can be changed for the predetermined period. Therefore, the power supply voltage variation response characteristic can be improved while the stability of the output voltage to oscillation is maintained.

What is claimed is:
1. A switching regulator control IC, comprising:
   an error amplifier for comparing an output voltage from a switching regulator with a reference voltage and amplifying a voltage difference therebetween to perform feedback control; and an output control circuit connected with an output of the error amplifier, for keeping a gain of the error amplifier constant for a predetermined period after a power supply voltage varies, the output control circuit comprising:
  an output resistance circuit; and
  a power supply voltage variation response improving circuit connected to the output resistance circuit and comprising:
    a power supply voltage increase regulation circuit for detecting a power supply voltage increase; and
    a power supply voltage decrease regulation circuit for detecting a power supply voltage decrease,
  wherein the power supply voltage variation response improving circuit is configured to control the output resistance circuit for keeping a gain of the error amplifier constant for a predetermined period after a power supply voltage varies.

2. A switching regulator, comprising:
  a power supply, a switching element, and an inductor which are connected in series; and
  a switching regulator control IC according to claim 1 for monitoring the output voltage and controlling the switching element based on the monitored output voltage.

3. The switching regulator control IC of claim 1, where the output resistance circuit comprises:
  a first resistor and a second resistor connected in parallel; and
  an N-type MOS transistor connected to the first resistor and comprising a gate connected to an output of the power supply voltage variation response improving circuit.

4. The switching regulator control IC of claim 3, wherein the power supply voltage variation response improving circuit is configured to put the N-type MOS transistor in an off state for the predetermined period when the power supply voltage is in a variation state.

5. The switching regulator control IC of claim 3, the power supply voltage variation response improving circuit further comprising:
  a NOR circuit comprising:
    a first input connected to an output of the power supply voltage increase regulation circuit;
    a second input connected to an output of the power supply voltage decrease regulation circuit; and
    an output, wherein the output of the NOR circuit is the output of the power supply voltage variation response improving circuit connected to the gate of the N-type MOS transistor.

6. The switching regulator control IC of claim 1, wherein the power supply voltage increase regulation circuit is configured to output a High-level output when the power supply voltage increases, and wherein the power supply voltage decrease regulation circuit is configured to output a High-level output when the power supply voltage decreases.

7. A switching regulator control IC, comprising:
  a dividing resistor portion for receiving an output voltage from a switching regulator and generating a dividing voltage based on the output voltage;
  a reference voltage circuit for generating a reference voltage;
  an error amplifier for amplifying a voltage difference between the dividing voltage and the reference voltage;
  an output resistance circuit for switching a gain of the error amplifier between a low-frequency region of the output voltage and a high-frequency region thereof, where the output resistance circuit comprises:
    a first resistor and a second resistor connected in parallel; and
    an N-type MOS transistor connected to the first resistor and comprising a gate connected to an output of the power supply voltage variation response improving circuit;
  a power supply voltage variation response improving circuit connected with the output resistance circuit and comprising:
    a power supply voltage increase regulation circuit and
    a power supply voltage decrease regulation circuit,
    wherein the power supply voltage variation response improving circuit is configured to put the N-type MOS transistor in an off state for a predetermined period when the power supply voltage is in a variation state;
  a triangular wave generating circuit for generating a triangular wave voltage; and
  a PWM comparator for comparing a voltage outputted from the error amplifier with the triangular wave voltage to generate a PWM signal,
  wherein the power supply voltage variation response improving circuit controls the output resistance circuit to keep the gain of the error amplifier constant after a power supply voltage varies.

8. A switching regulator control IC according to claim 7, wherein the output resistance circuit comprises:
  a first resistor and a second resistor which are connected in parallel; and
  a capacitor and a switch circuit which are connected in series with the second resistor, and
  wherein the switch circuit is controlled by the power supply voltage variation response improving circuit.

9. A switching regulator control IC according to claim 8, wherein the switch circuit is caused to be off by the power supply voltage variation response improving circuit for a predetermined period after the power supply voltage varies.

10. A switching regulator, comprising:
  a power supply, a switching element, and an inductor which are connected in series; and
  a switching regulator control IC according to claim 7 for monitoring the output voltage and controlling the switching element based on the monitored output voltage.

11. The switching regulator control IC of claim 7, the power supply voltage variation response improving circuit further comprising:
  a NOR circuit comprising:
    a first input connected to an output of the power supply voltage increase regulation circuit;
    a second input connected to an output of the power supply voltage decrease regulation circuit; and
    an output, wherein the output of the NOR circuit is the output of the power supply voltage variation response improving circuit connected to the gate of the N-type MOS transistor.

12. The switching regulator control IC of claim 7, wherein the power supply voltage increase regulation circuit is configured to output a High-level output when the power supply voltage increases, and wherein the power supply voltage decrease regulation circuit is configured to output a High-level output when the power supply voltage decreases.

* * * * *